J. S. MORRIS.
Beef-Steak Tenderers.
No. 144,216.  Patented Nov. 4, 1873.
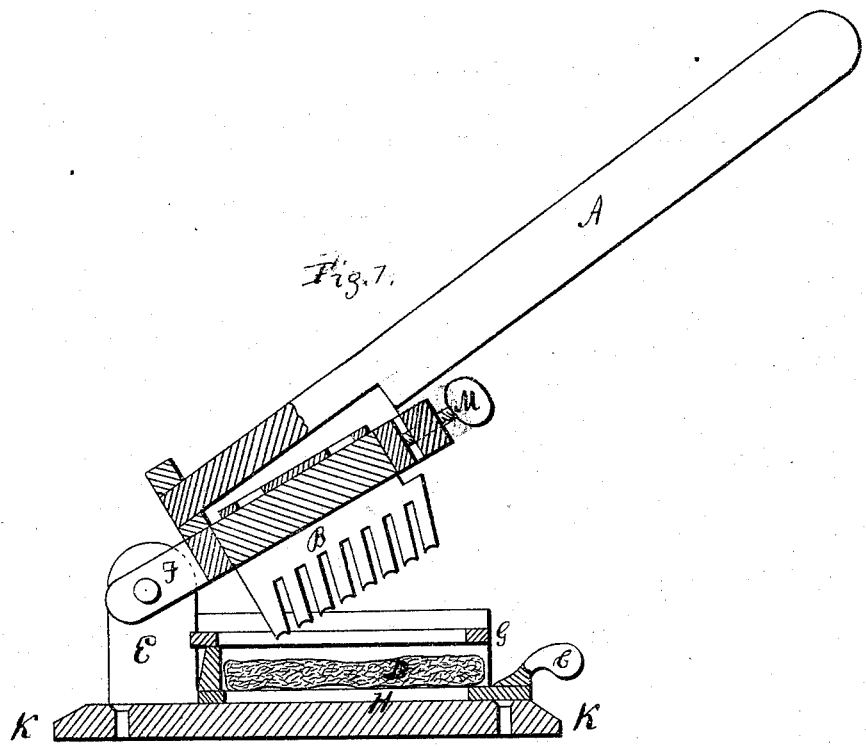
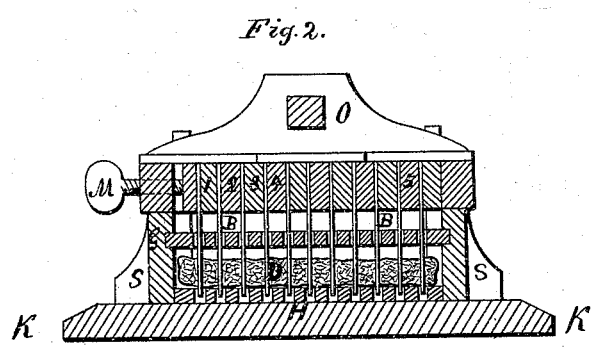
WITNESSES.  
A B Richmond  
J T White
INVENTOR  
James S. Morris

UNITED STATES PATENT OFFICE.

JAMES S. MORRIS, OF MOSIERTOWN, PENNSYLVANIA.

IMPROVEMENT IN BEEFSTEAK-TENDERERS.

Specification forming part of Letters Patent No. 144,216, dated November 4, 1873; application filed August 29, 1873.

*To all whom it may concern:*

Be it known that I, JAMES SAMUEL MORRIS, of Mosiertown, in the county of Crawford, State of Pennsylvania, have invented a new and Improved Beefsteak-Masticator; and I do hereby declare that the following is a full and exact description of the same, reference being had to the accompanying drawings and the letters of reference marked thereon.

My invention relates to devices used for rendering meat more tender, and easier of mastication; and the invention consists in certain improvements in such devices, whereby the meat is pierced completely through by a number of knives arranged like the teeth of a comb, so as to cut the fiber, yet not completely sever or disintegrate the portion of meat operated on, and by means of which the teeth are withdrawn from the steak or meat without disfiguring its appearance, the meat being prevented from adhering to the knives or teeth by certain devices, all as hereinafter more fully set forth.

In the accompanying drawings, Figure 1 represents a side sectional view of my improved meat-tenderer. Fig. 2 represents an end view of same, also in section.

K K is the bed-plate of my device. On this bed-plate is a stud or post, E, on which the frame F is hung, so that it may be moved up and down by the lever A. The frame F may be constructed of any desired size, and in this frame are securely fastened a number of steel or other metal comb-shaped knives, of which B is a side view. These knives are separated from each other by a little slat of wood or metal, and the desired number of them are securely fastened and adjusted in the frame F by wedges or set-screws M. G is a metal or wooden grate, sustained by the sides S S, Fig. 2. This grate is so constructed that when the lever A is pressed down the knives will pass between the grate-bars. H is a similar grate, resting on the bed-plate K K between the sides S S, and may be removed by the handle C.

The beefsteak is placed on the grate H, (see D, Fig. 1 and Fig. 2,) and the grate shoved into its place, as represented in the drawing, when the lever A is pressed down, the knives B passing through it, and down between the grate-bars of H, as shown at Fig. 2. When the lever A is lifted, the grate G, Fig. 2, prevents the steak from adhering to the knives. The knives being constructed like the teeth of a comb, enough of the fiber of the steak is preserved intact to keep piece of steak together in its original shape.

1, 2, 3, 4, and 5 show the slats of wood between the knives to keep them apart and in their proper places. O represents a hole from which the lever A is withdrawn.

What I claim as my invention, and desire to secure by Letters Patent, is as follows, to wit:

A series of knives, B, secured in frame F, in combination with the grates G and H, constructed and operated in the manner described, for the purposes set forth.

JAMES SAMUEL MORRIS.

Witnesses:
 A. B. RICHMOND,
 I. T. WHITE.